Jan. 26, 1943.　　　J. A. HARSHAW　　　2,309,314
RADIO GUIDANCE SYSTEM
Filed Dec. 26, 1940　　　2 Sheets-Sheet 1
Fig. 1
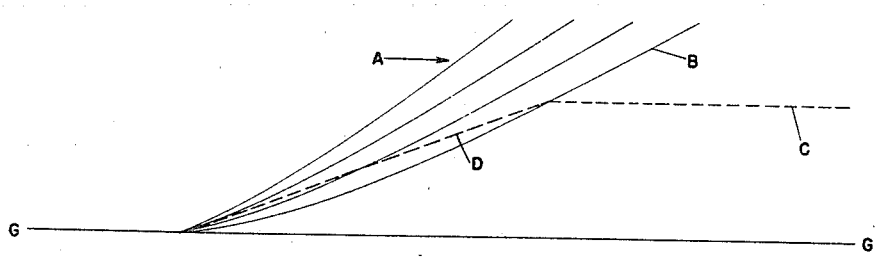
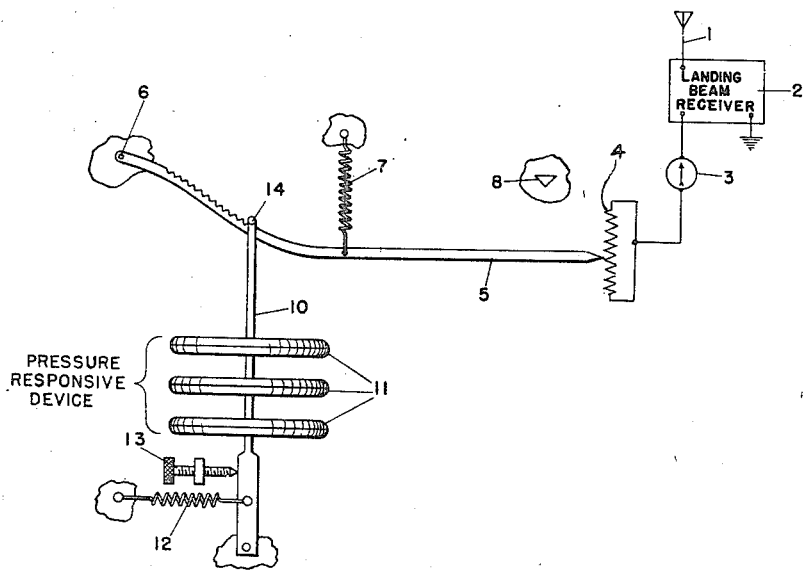
Fig. 2
Inventor
JOHN A. HARSHAW
By Samuel Schweuer Jr.
Attorney

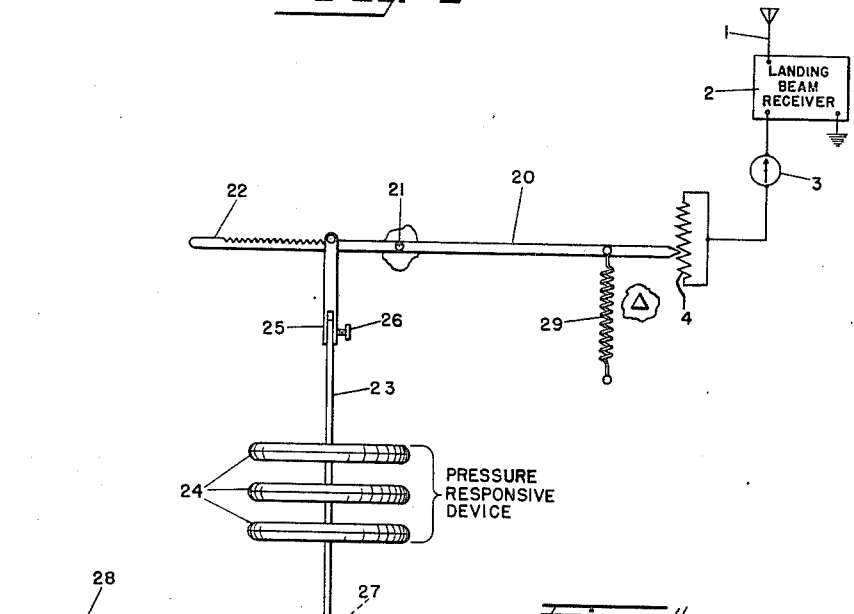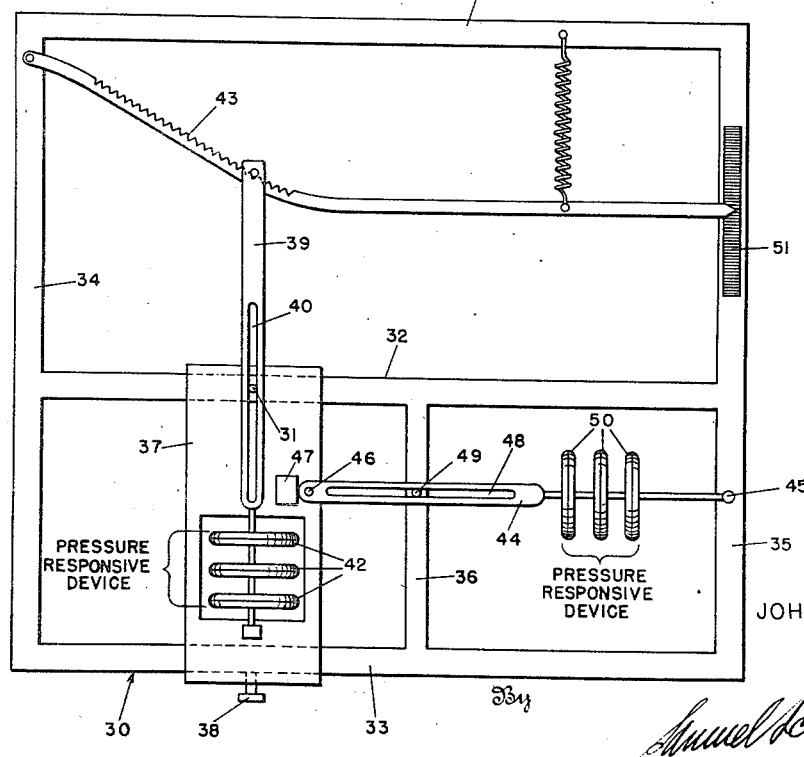

Patented Jan. 26, 1943

2,309,314

UNITED STATES PATENT OFFICE 2,309,314

RADIO GUIDANCE SYSTEM

John A. Harshaw, Silver Spring, Md., assignor to Washington Institute of Technology, Inc., Washington, D. C., a corporation of Delaware Application December 26, 1940, Serial No. 371,750

19 Claims. (Cl. 250—11)

This invention relates, generally, to radio systems for guiding aircraft or other mobile bodies and, more particularly, is intended to provide a means for causing an aircraft or other mobile body to follow a path of predetermined shape during any operation which involves a change in altitude.

It is the primary object of the invention to provide a radio guidance system including means controlled by change in atmospheric or other pressure for permitting or causing the aircraft to be guided along a path of predetermined shape and with respect to a radiated field including a path of different shape. A further object is to provide means controlled by change in atmospheric pressure as the aircraft changes altitude, for varying in a predetermined manner the overall sensitivity of the receiving means carried by the aircraft, as the aircraft is moved with respect to a radiated field defining a path of known shape, to thereby permit or cause the aircraft to follow a path having a shape different from that of the known path. It is a further object of the invention to provide means for maintaining constant, during a predetermined change in altitude of the aircraft, the amount of response of the altitude-controlled means which vary the characteristics of the receiving means, regardless of the actual altitude of the aircraft at the beginning and ending of the change in altitude.

Other objects and features of novelty of the invention will be made apparent by the following description and the annexed drawings, it being understood that such description and drawings are merely illustrative of the invention and impose no limitations thereon.

Referring to the drawings,

Fig. 1 is a schematic diagram illustrating the use of the invention;

Fig. 2 is a schematic and circuit drawing showing one means for carrying out the invention;

Fig. 3 is a schematic and circuit drawing similar to Fig. 2 and disclosing a second embodiment of the invention, and Fig. 4 is a schematic and circuit drawing disclosing an embodiment of the invention including automatic control means.

In the system which I have provided by the present invention there is radiated a field including a path having any known shape. The receiving means carried by the aircraft is adjusted in predetermined amounts and sequence to cause an apparent modification of the shape of this path, thus changing only the shape of the path followed by the aircraft without changing or affecting in any way the radiated field or the actual shape of the established path. I utilize change in altitude of the aircraft, and the consequent change in atmospheric pressure at the location thereof, as the means for adjusting the receiving means to produce the apparent change in path shape.

While the invention is useful for guiding an aircraft in any operation involving a change in altitude, the invention will be described, for purposes of simplification of this application, as applied to a landing system for aircraft. It is usual in such systems to provide a radiated field including lines of constant field intensity, which may be of straight or parabolic shape, having their lowest points on the earth at the landing area and extending upwardly into space. Receiving and indicating means adjusted to provide an on-course indication when on a predetermined one of such lines may be used to guide an aircraft along such a line to a landing by navigating it in such a manner as to maintain the on-course indication. However, the particular line or path which the aircraft will follow will be solely a function of the adjustment of the receiver. The invention provides a means for guiding an aircraft along a path of predetermined shape when navigated in a radiated field defining or including a path of known but different shape, such as the described parabolic line of constant field intensity. Thus if the field A of Fig. 1 is established in a well-known manner, it will include an infinite number of parabolic lines of constant field intensity such as that shown at B. An aircraft carrying a receiver adjusted to provide an on-course indication when a signal of the intensity occurring along the line B is received may be guided to a landing by so navigating the aircraft that the on-course indication is maintained. This will result in the descent of the aircraft along a parabolic path to earth. It will be seen however that, if desired, the receiver may be so adjusted that it will not provide an on-course signal when on path B and, if the receiver adjustment is varied in predetermined amounts and sequence, the aircraft may be caused to descend along a path of any predetermined shape by navigating it in the field A in such a way that an on-course signal is maintained.

Accordingly, in the disclosed embodiment of the invention the characteristics of the receiver carried by the aircraft are varied in predetermined amounts and sequence, in order that when the receiver is tuned to receive field A it will cause an on-course indication to be produced when the aircraft is on a desired landing path of a predetermined shape which is different from the shape of path B. I provide means responsive to change in air pressure for progressively varying the overall sensitivity of the receiving means carried by the aircraft, thereby causing a progressive and predetermined variation in such overall sensitivity as the aircraft descends to an airport. In view of the fact that different airports are at different altitudes above sea-level, it will be apparent that the response of the air-pressure responsive control means of my invention will not be uniform in descending to different airports, although the landing operation may begin in each case at the same height above the airport. I have therefore provided means for causing the non-uniform action of the air-pressure responsive control means to have a uniform effect on the receiving means.

In Fig. 2 of the drawings I disclose one means or system by which my invention is carried out. This system comprises, generally, means responsive to the atmospheric pressure at the receiver, and therefore responsive to the altitude of the aircraft, for adjusting the overall sensitivity of the receiving system to thereby modify the apparent shape of the landing path. Such means or system comprises an antenna 1 which is carried by the aircraft and receives energy from the field A, a landing beam receiver 2, of known construction and operation, an indicator 3 which is operable normally, by reason of the adjustment of the receiving means, to produce an on-course indication when the aircraft is on path B, means such as a resistance 4 which is connected to control the overall sensitivity of the receiving means, and means for varying the resistance 4 as the altitude of the aircraft changes.

The disclosed means for varying the resistance 4 comprise a grounded arm 5, one end of which is in sliding contact with resistance 4 and the other end of which is pivoted at 6. This arm is of angular shape and includes a straight portion adjacent the resistance 4 and a portion angularly arranged with respect to the straight portion adjacent the pivot 6, which latter portion will be referred to hereinafter as the inclined portion of the arm. A resilient means of any desired type, such as the spring 7, constantly urges the arm toward a stop 8, in which position it is at the upper end of the resistance 4, a minimum of which is therefore in circuit with the receiving means. An indicator, such as a signal lamp may be provided to indicate that the arm is in normal position at the upper end of the resistance.

Means are provided by the invention for moving the arm across the resistance 4, thus varying the effective value of the resistance and therefore the overall sensitivity of the receiving means, to successive positions each of which will be a function of the altitude of the aircraft. Such means comprise an arm 10 which is pivotally mounted at its lower end and the other or upper end of which carries an abutment 14 which is positioned above and adapted to engage the serrated upper surface of the inclined part of arm 5. The arm 10 is of variable length, including at one or more points therein one or a plurality of pressure-responsive devices such as the bellows 11 which are of known construction and operation. A resilient means such as the spring 12 constantly urges arm 10 and the bellows included therein about the pivotal support of the arm in a direction toward the upper end of the inclined portion of arm 5. An adjusting screw 13 contacts arm 10 and is operable to move the arm about its pivot against the force of spring 12. It will be seen that spring 7 constantly urges arm 5 toward the upper end of resistance 4, but that the arm will be moved away from this position by compression of the bellows 11 acting on arm 5 through the contact between the abutment 14 and the upper surface of the arm.

If the bellows are expanded, as by a decrease in atmospheric pressure due to an increase in the altitude of the aircraft, the overall length of arm 10 will be increased and the spring 7 will move the arm 5 toward the upper end of resistance 4. It will also be seen that if the adjusting screw 13 is operated to move the arm 10 against the force of spring 12, the engagement between the sliding contact on arm 10 and the inclined portion of arm 5 will be relieved, thus permitting spring 7 to move arm 5 toward the upper end of resistance 4. The adjusting screw thus provides a means for setting the arm 5 at the end of resistance 4, after which any compression of the bellows by an increase in atmospheric pressure due to decrease in the altitude of the aircraft will, by decreasing the overall length of arm 10, move the arm 5 to a position on the resistance which is a function of the decrease in the altitude of the aircraft.

In order to achieve proper operation of the system described, in landing along a path of desired shape, it is preferable that the arm 5 traverse the entire resistance 4, thereby varying the resistance, and consequently the overall sensitivity of the receiving means, through a complete predetermined sequence. In order to effect this, it is preferable that each landing operation begin at a predetermined height above the airport, for example 1500 feet. Inasmuch as different airports are at different altitudes above sea-level, it will be apparent that in landing on different airports the landing operation will begin at different altitudes and that the change in atmospheric pressure in landing at one airport will be different from the change involved in landing at another. Thus, if the resistance 4 is so dimensioned that the arm 5 will completely traverse it in landing from 1500 feet above an airport which is just at sea-level, the resistance will not be completely traversed in landing on an airport which is 1000 feet above sea-level, due to the fact that the landing operation in the latter case will begin at 2500 feet above sea-level and the change in the length of arm 10 will not be as great as in the former case.

I therefore provide means for causing the change in the overall length of the arm 10 due to a predetermined descent, for example 1500 feet, to cause arm 5 to completely traverse resistance 4, regardless of the height above sea-level at which the landing operation begins. Such means are comprised in the inclined portion of arm 5, against the upper surface of which the abutment 14 on the upper end of arm 10 bears. This inclined portion is so shaped that any change in the overall length of arm 10 due to a decrease in altitude of 1500 feet will cause arm 5 to completely traverse resistance 4. It will be apparent that arm 10, including bellows 11, will have a definite overall length for each height above sea-level and will undergo a definite change in length when lowered 1500 feet from each altitude. Accordingly, the inclined portion of arm 5 is so shaped that each point thereof is so displaced from pivot 6 and from the free end of the arm that if the abutment on the end of arm 10 is caused to bear on that point, the change in the length of arm 10 caused by a decrease in altitude of 1500 feet will cause the free end of arm 5 to completely traverse resistance 4. It will be seen that at each height above sea-level the arm 10 will have a characteristic length which will correspond to one point on the inclined portion of arm 5.

In the operation of the described system, it may be assumed that the field A of Fig. 1 is radiated above a landing area and includes the usual parabolic line of constant field intensity B, that an aircraft is approaching the landing area along the path C at an altitude of 1500 feet above the airport G—G and is to land along a straight-line path D. While the aircraft is on line C the arm 10 will have a constant overall length. The abutment on the upper end of arm 10 is now moved into engagement with the inclined part of arm 5 by moving arm 10 about its pivotal support by adjustment of set-screw 13, it being noted that the spring 7 has already moved arm 5 to its uppermost position against the abutment 8, and that the point of engagement of abutment 14 with arm 5 corresponds to the overall length of arm 10 at the height above sea-level of path C. Thus, when the aircraft intersects path B, no part of resistance 4 is in the receiver circuit and an on-course indication will be produced. The aircraft is caused to descend and as it does so the increase in atmospheric pressure causes compression of bellows 11, thus decreasing the overall length of arm 10 to an extent proportional to the decrease in altitude and moving arm 5 across resistance 4, thus varying the resistance and the overall sensitivity of the receiving means and, if the aircraft is on the path B, moving the indicator from an on-course indication. In order to cause an on-course indication to be produced, showing that the aircraft is following the desired path D, the aircraft must be navigated above the line B in order that at each instant the compression of the bellows and consequently the amount of resistance 4 in circuit with the receiver will be just sufficient to provide an on-course indication. Expressed otherwise, if the aircraft were navigated along line B an on-course indication would normally be produced. The path D, lying above path B, is in an area of greater field intensity and, unless the overall sensitivity of the receiving means is varied, navigation of the aircraft along line D would cause the production of an indication showing the aircraft to be off course. However, by introducing the resistance 4 into the receiver circuit the increase in received field strength, due to the fact that the aircraft is on line D instead of on line B, is compensated and an on-course signal is produced.

It will be apparent that by proper proportioning of the resistance 4 and by proper shaping of the inclined part of arm 5 any desired variation in overall sensitivity of the receiving means may be produced. By this means a landing path of any desired shape may be produced.

Obviously the device illustrated in Fig. 2 constitutes only one possible means for providing a predetermined and constant movement of the contact end of arm 5 across the resistance 4. As stated, the variable factor which may change the amount of movement of the end of the contact arm is the amount of change of atmospheric pressure involved in making the predetermined descent and one of the chief features of this invention is the provision of means for compensating for the variation in this factor, thus causing a predetermined amount of movement of the contact arm. A large variety of means and devices for effecting this result may be provided within the scope of the invention and in Fig. 3 I disclose such a means which is different from that disclosed in Fig. 2. In this system the arm 20, which corresponds to the arm 5, is pivoted intermediate its ends on a fixed support 21. One end of the arm is in sliding contact with the resistance 4 and the other end of the arm is serrated, as shown at 22, to receive and position an abutment on the upper end of an arm 23 which may be moved along the serrated portion of the lever arm to any desired position. The arm 23 includes pressure-responsive means 24 whereby the overall length of the arm varies with change in atmospheric pressure. The arm 23 is also divided intermediate its length and the two parts are joined by a telescopic connection 25 including a set-screw 26, whereby the overall length of the arm may be set as desired. The lower end of arm 23 is enlarged as at 27 and is received within an elongated channel-shaped member 28 which extends parallel to the serrated end of lever arm 20. It will be seen that the arm 23 may be moved longitudinally of the lever arm 20 and the member 28 and will be held in any desired position by engagement of the abutment on the upper end of the arm with the serrations on arm 20.

In the operation of the system disclosed in Fig. 3, it may again be assumed that the aircraft is approaching the landing area G—G along path C and wishes to land along path D. As the radiated field A is approached, the set-screw 26 is released in order to permit the two parts of arm 23 to move with respect to each other and the entire arm 23 is then moved along the arm 20 and guide 28 to a position corresponding to the altitude above sea-level of the path C, which may be denoted on a scale marked on lever-arm 20. When in this position the arm 20 is moved by resilient means 29 to the lower end of resistance 4, and the two parts of arm 23 are moved to a final position in which they are fixed by the set-screw. The further operation of the device is similar to the operation of the system disclosed in Fig. 2, it being seen that the arm 23 is so positioned with respect to pivot 21 that the change in overall length of arm 23 due to a descent of 1500 feet from the altitude of path C will be translated into a movement of the contact end of arm 20 which is just sufficient to cause the same to completely traverse resistance 4. Thus, each possible position of arm 23 along lever-arm 20 will correspond to a possible altitude of the aircraft as it begins the landing operation or other change in altitude.

In each of the systems disclosed in Figs. 2 and 3 the adjustment of the pressure-responsive arm 10 or 23 with respect to the contact arm 5 or 20 necessitates the use of the aircraft altimeter as a reference for proper adjustment. It will be apparent however that means, such as a pressure-responsive device, may be associated with the pressure-responsive arm in order to cause this arm to constantly occupy a position which is dependent upon and a function of the altitude of the aircraft and to also cause the arm to automatically assume an initial position which will be dependent on the altitude of the aircraft at the beginning of the landing or other operation. In this way the necessity of a manual setting of the pressure-responsive unit 10, 11 is avoided. One possible system including such a means is disclosed in Fig. 4 of the drawings. While such means are disclosed as associated with a system which is generally similar to that disclosed in Fig. 2, it will be apparent that the automatic control means which are of particular interest here may be applied to the system of Fig. 3 or to any other system which effects the same result, all without departing from the scope of the invention.

In the preferred embodiment of the invention, as illustrated in Fig. 4, there is provided a support which in the form illustrated comprises a supporting frame 30 having spaced parallel bars 31, 32, 33 which are connected at their ends by side members 34, 35, the adjacent bars 32, 33 being connected by a bar 36. A plate 37 is mounted on bars 32, 33 for sliding movement along the length thereof and means, such as the set-screw 38, are provided for locking the plate at any desired position on the bars. A pressure-responsive arm 39 is rigidly connected at its one end to the lower part of plate 37 and extends upwardly across the face thereof, an elongated slot 40 in the arm receiving a pin 41 which is carried by the plate. One or a plurality of pressure-responsive devices, such as the bellows 42 are incorporated in arm 39, whereby the overall length of the arm is a function at all times of the pressure at the bellows. The upper end of the arm is adapted to engage an arm 43 which is shown as corresponding in structure and function to the arm 5 of Fig. 2 and the arm 29 of Fig. 3. Arm 43 is pivoted at its one end to frame member 34 and its other end is in sliding contact with a resistance 51 which may be mounted on frame member 35 and which corresponds in function and purpose to the resistance 4 of Figs. 2 and 3.

A second arm 44 is mounted on the frame and extends at right angles to arm 39. One end of this arm is connected to the frame at a point 45 which is remote from arm 39 and the other end of the arm carries a pin 46 which is adapted to engage in an aperture in plate 37 in order to releasably connect the arm and the plate. The end of arm 44 adjacent pin 46 engages an abutment 47 on plate 37 when the pin is engaged in the aperture. An elongated slot 48 is formed in arm 44 and receives a pin 49 which is carried by the cross-bar 36. One or a plurality of pressure-responsive devices 50 are incorporated in arm 44 whereby the overall length of the arm changes in response to changes in pressure at the bellows.

It will be seen that so long as arm 44 is connected to plate 37 by pin 46 the pressure-responsive devices 50 will move plate 37, through arm 44, in response to changes in atmospheric pressure at the receiver. The position of arm 39 with respect to arm 43 will therefore at all times be determined by the overall length of arm 44 and will be a function of the atmospheric or other pressure at the receiver. The overall length of arm 39 will also vary with changes in atmospheric pressure and it will therefore be seen that the end of arm 39 which engages arm 43 will at all times be in the proper position to immediately operate the arm 43 in any landing operation.

During any landing or other operation in which the described system is to be used it will be necessary to disconnect arm 44 from plate 37 and to attach plate 37 firmly to the frame 30. The disconnection of arm 44 may be effected by removing pin 46 from the aperture in plate 37, and the plate may be locked to the frame by means of the set-screw 38. After the landing or other altitude-changing operation is completed the set-screw may be released and the arm 44 again connected to plate 37 in order that the automatic positioning of arm 39 will again be effected.

In order to check the operation of any of the described systems without effecting a complete landing operation, contacts may be positioned at each end of the resistances 4 and 51 of Figs. 2, 3 and 4 which, upon engagement by the associated contact arm will cause the energization of suitable signals. Thus, by effecting a predetermined and measured change in altitude, without landing the aircraft, the operation of the system to cause a complete traverse of the contact arm across the resistance by a predetermined change in altitude may be observed and checked.

The proper operation of the system may also be checked by subjecting the pressure-responsive devices to ambient pressure produced by a local source of hydraulic, air or other pressure and, if desired, such ambient pressure may be utilized during an altitude-changing operation, in place of atmospheric pressure.

I have therefore provided a new and useful system of radio guidance for aircraft in which the overall sensitivity of the landing beam receiving means is varied in a predetermined manner and sequence so that a path of predetermined shape will be followed when the aircraft is navigated with respect to a radiated field including a path of known but different shape, the variation of the overall sensitivity of the receiving means being just sufficient at all times to cause an on-course indication to be produced when the aircraft is navigated in a predetermined manner with relation to a known path.

I have described and illustrated several means for carrying out my invention, and these disclosures are schematic in nature but sufficient to permit practice of the invention by those skilled in the art. Many other means, systems and devices useful in effecting the invention or in replacing parts of the disclosed means will occur to those skilled in the art. Further, and as stated hereinbefore, the invention may be utilized in guiding an aircraft in any operation involving a change in altitude. Further, while the connection of resistance 4 to the receiving means in the manner illustrated is particularly useful in effecting a landing as illustrated in Fig. 1 and otherwise other means may be substituted for the resistance 4 or the illustrated connection thereof to the receiving means may be changed to produce a desired result or path. All of such changes and embodiments different from those disclosed are to be understood as being within the spirit and scope of this invention, for the limits of which reference must be had to the appended claims.

I claim:

1. A radio system for guiding an aircraft, comprising receiving means carried by the aircraft and adapted to receive a radiated field defining a path of known shape and position in space and to produce a predetermined indication when on said path, and means responsive to changes in the altitude of the aircraft for compensating in a predetermined amount and sequence for variations in received energy caused by a predetermined deviation of the aircraft from said known path, to thereby cause said predetermined indication to be produced when the aircraft follows a predetermined path different from said known path.

2. A radio system for guiding an aircraft, comprising receiving means carried by the aircraft and adapted to receive a radiated field defining a path of known shape and position in space and to produce a predetermined indication when on said path, and fluid pressure-responsive means for compensating for variations in received energy caused by a predetermined deviation of the aircraft from said known path, to thereby cause said predetermined indication to be produced when the aircraft follows a predetermined path different from said known path.

3. A radio system for guiding an aircraft, comprising receiving means carried by the aircraft and adapted to receive a radiated field defining a path of known shape and position in space and to produce a predetermined indication when on said path, and means responsive to changes in the altitude of the aircraft for varying the characteristics of said receiving means by sufficient amounts and in a proper sequence to cause said receiving means to produce said predetermined indication when the receiving means is moved along a path different from said known path.

4. A radio system for guiding an aircraft, comprising receiving means carried by the aircraft and adapted to receive a radiated field defining a path of known shape and position in space and to produce a predetermined indication when on said path, and fluid pressure operated means for varying the characteristics of said receiving means by sufficient amounts and in a proper sequence to cause said receiving means to produce said predetermined indication when the receiving means is moved along a path different from said known path.

5. A radio system for guiding an aircraft in an operation involving a change in altitude, comprising receiving means carried by the aircraft and adapted to receive a radiated field defining a path of known shape and position in space and being in a vertical plane and to produce a predetermined indication when on said path, and means responsive to changes in atmospheric pressure at the location of the receiving means for varying the characteristics of said receiving means to thereby produce said predetermined indication when the receiving means is moved from one altitude to another in said plane along a path different from said known path.

6. A radio system for guiding an aircraft in an operation involving a change in altitude, comprising receiving means carried by the aircraft and adapted to receive a radiated field defining a path of known shape and position in space and to produce a predetermined indication when on said path, and means responsive to changes in atmospheric pressure at the location of the receiving means for varying the overall sensitivity of said receiving means by sufficient amounts and in a proper sequence to cause said receiving means to produce said predetermined indication when the receiving means is moved from one altitude to another along a path different from said known path.

7. A radio system for guiding an aircraft in an operation involving a change in altitude, comprising receiving means carried by the aircraft and adapted to receive a radiated field defining a path of known shape and position in space and being in a vertical plane and to produce a predetermined indication when on said path, a variable resistance included in the circuit of said receiving means, and means responsive to changes in atmospheric pressure at the location of the receiving means for varying said resistance by sufficient amounts and in a proper sequence to cause said receiving means to produce said predetermined indication when the receiving means is moved from one altitude to another in said plane along a path different from said known path.

8. A radio system for guiding an aircraft in an operation involving a change in altitude, comprising receiving means carried by the aircraft and adapted to receive a radiated field defining a path of known shape and position in space and being in a vertical plane and to produce a predetermined indication when on said path, a variable resistance included in the circuit of said receiving means, and atmospheric pressure operated means for varying said resistance by sufficient amounts and in a proper sequence to cause said receiving means to produce said predetermined indication when the receiving means is moved in said plane from one altitude to another along a path different from said known path.

9. A radio system for guiding an aircraft in an operation involving a change in altitude, comprising receiving means carried by the aircraft and adapted to receive a radiated field defining a path of known shape and position in space and to produce a predetermined indication when on said path, a resistance included in the circuit of said receiving and indicating means, a grounded arm one end of which is movable over said resistance to vary said resistance and thereby vary the overall sensitivity of said receiving means, and means responsive to changes in atmospheric pressure at the location of the receiving means for moving said arm over said resistance to positions which at any instant are proportional to the altitude of the aircraft to thereby vary said resistance sufficiently and in proper sequence to cause said receiving means to produce said predetermined indication when the receiving means is moved from one altitude to another along a path different from said known path.

10. A radio system for guiding an aircraft in an operation involving a change in altitude, comprising receiving means carried by the aircraft and adapted to receive a radiated field defining a path of known shape and position in space and to produce a predetermined indication when on said path, a resistance included in the circuit of said receiving means, a grounded arm one end of which is in sliding contact with said resistance, and means responsive to changes in atmospheric pressure at the location of the receiving means for moving said arm over said resistance to positions which at each instant are proportional to the altitude of the aircraft to thereby vary said resistance sufficiently and in proper sequence to cause said receiving means to produce said predetermined indication when the receiving means is moved from one altitude to another along a path different from said known path.

11. A radio system for guiding an aircraft in an operation involving a change in altitude, comprising receiving means carried by the aircraft and adapted to receive a radiated field defining a path of known shape and position in space and being in a vertical plane and to produce a predetermined indication when on said path, a resistance included in the circuit of said receiving means, a grounded arm one end of which is in sliding contact with said resistance, and means including at least one atmospheric pressure responsive bellows operably connected to said arm for moving said arm across said resistance to positions which at any instant are proportional to the altitude of the aircraft to thereby vary said resistance sufficiently and in proper sequence to cause said receiving means to produce said predetermined indication when the receiving means is moved in said plane from one altitude to another along a path different from said known path.

12. A radio system for guiding an aircraft in an operation involving a change in altitude, comprising receiving means carried by the aircraft and adapted to receive a radiated field defining a path of known shape and position in space and being in a vertical plane and to produce a predetermined indication when on said path, a resistance included in the circuit of said receiving and indicating means, a pivoted grounded arm one end of which is in sliding contact with said resistance, a second arm operably connected to the first arm, and means for varying the overall length of the second arm in response to changes in air pressure at the location of the receiving means to thereby move the first arm over said resistance to positions which at any instant are proportional to the altitude of the aircraft to thereby vary said resistance sufficiently to cause said receiving means to produce said predetermined indication when the receiving means is moved in said plane from one altitude to another along a path different from said known path.

13. A radio system for guiding an aircraft in an operation involving a change in altitude, comprising receiving means carried by the aircraft and adapted to receive a radiated field defining a path of known shape and position in space and being in a vertical plane and to produce a predetermined indication when on said path, a resistance included in the circuit of said receiving means, a pivoted grounded arm one end of which is in sliding contact with said resistance, a second arm operably connected to the first arm and including at least one air-pressure operated bellows for varying the overall length of the second arm in response to changes in air pressure at the location of the receiving means to thereby move the first arm over said resistance to positions which at any instant are proportional to the altitude of the aircraft to thereby vary said resistance sufficiently to cause said receiving means to produce said predetermined indication when the receiving means is moved in said plane from one altitude to another along a path different from said known path.

14. A radio system for guiding an aircraft in an operation involving a change in altitude, comprising receiving means carried by the aircraft and adapted to receive a radiated field defining a path of known shape and position in space and to produce a predetermined indication when on said path means operable to vary the overall sensitivity of said receiving means, and means operated by changes in air pressure at the receiver for operating said sensitivity-varying means, the sensitivity varying means and the air pressure operated means being so constructed and related that the same change in sensitivity is always produced by a predetermined change in altitude.

15. A radio system for guiding an aircraft in an operation involving a change in altitude, comprising receiving means carried by the aircraft and adapted to receive a radiated field defining a path of known shape and position in space and to produce a predetermined indication when on said path, means operated by changes in air pressure at the receiver to vary the overall sensitivity of said receiving means, said sensitivity-varying means comprising two interconnected arms the length of one of which is variable in accordance with changes in air pressure and the other of which is operated by variations in the length of the first, and means for varying the effective travel of the second arm by varying the location of the point of connection between the two arms in accordance with the altitude of the aircraft at the beginning of the operation.

16. A radio landing system for aircraft comprising transmitting means radiating a field defining a path having its origin on the ground and extending upwardly into space, receiving means carried by an aircraft for receiving said field and producing from the received energy a predetermined indication when the aircraft is on said path, means operated by changes in air pressure at the receiver for varying the receiver output in predetermined amounts and sequence, whereby said predetermined indication is produced when the aircraft follows a path displaced in a predetermined manner from said known path.

17. A radio system for guiding an aircraft in a descent to a landing area, comprising receiving means carried by the aircraft and adapted to receive a radiated field including lines of constant field intensity of known shape and positions in space and to produce a predetermined indication when on one of said lines of constant field intensity, a resistance in the circuit of said receiving and indicating means, a grounded arm which is pivoted at one end and the other end of which is in sliding contact with said resistance to vary the effective resistance of said receiving means, a second arm of variable length pivoted at one end and operably connected at its other end to the first named arm to move the first named arm about its pivot upon variation in the length of the second arm, means operated by changes in atmospheric pressure at the receiver for varying the length of the second arm, the first arm being shaped intermediate its ends to correspond at each point thereof with the length of the second arm at a certain altitude above sea-level, whereby when the second arm is engaged with any corresponding point on the first arm a predetermined decrease in the altitude of the aircraft will cause the second arm to be shortened, thereby moving the first arm about its pivot and across said resistance.

18. A radio system for guiding an aircraft in an operation involving a change in altitude, comprising receiving means carried by the aircraft and adapted to receive a radiated field defining a path of known shape and position in space and to produce a predetermined indication when on said path, means operated by changes in atmospheric pressure at the receiver to vary the overall sensitivity of said receiving means, said sensitivity varying means comprising two interconnected arms the length of one of which is variable in accordance with changes in atmospheric pressure and the other of which is operated by variations in the length of the first to vary the sensitivity of the receiving means, and means responsive to atmospheric pressure for varying the effective travel of the first arm by varying the location of the point of connection between the two arms in accordance with the altitude of the aircraft at the beginning of the operation.

19. A radio system for guiding an aircraft in an operation involving a change in altitude, comprising receiving means carried by the aircraft and adapted to receive a radiated field defining a path of known shape and position in space and to produce a predetermined indication when on said path, means including an arm pivoted intermediate its ends for varying the overall sensitivity of said receiver, a second arm operably connected to said pivoted arm to move the same about its pivot in response to variations in the overall length of the second arm, said second arm being mounted for movement along the length of the first arm to various positions dependent upon altitude at the beginning of the operation, said second arm including pressure responsive means operable to change the overall length thereof and having parts thereof telescopingly connected in order to permit adjustment of the length thereof.

JOHN A. HARSHAW.